United States Patent
McPherson

(10) Patent No.: US 8,274,263 B2
(45) Date of Patent: Sep. 25, 2012

(54) BATTERY SAVER

(76) Inventor: Jody McPherson, Spring Hill, FL (US)

( * ) Notice: Subject to any disclaimer, the term of this patent is extended or adjusted under 35 U.S.C. 154(b) by 393 days.

(21) Appl. No.: 12/662,088

(22) Filed: Mar. 30, 2010

(65) Prior Publication Data

US 2011/0241626 A1 Oct. 6, 2011

(51) Int. Cl.
*H02J 7/04* (2006.01)
*H01R 11/20* (2006.01)

(52) U.S. Cl. ........ 320/155; 320/116; 320/137; 320/158; 439/388

(58) Field of Classification Search .................... 320/155
See application file for complete search history.

(56) References Cited

U.S. PATENT DOCUMENTS

| | | | |
|---|---|---|---|
| 2,360,152 | A | 10/1944 | Nensel |
| 4,950,868 | A | 8/1990 | Moss et al. |
| 5,173,653 | A | 12/1992 | Hochstein |
| D439,561 | S | 3/2001 | Lee, IV et al. |
| 6,366,052 | B1 | 4/2002 | Centauro |
| 6,642,667 | B2 | 11/2003 | Avis |
| 6,759,831 | B1 | 7/2004 | Eldridge |
| 6,952,084 | B2 | 10/2005 | Bruwer |
| 6,975,093 | B2 | 12/2005 | Betancourt |
| 7,498,749 | B2 | 3/2009 | Bruwer |
| 7,573,212 | B2 | 8/2009 | Avis |
| 2003/0076073 | A1 | 4/2003 | Waltenberger |
| 2005/0002186 | A1 | 1/2005 | Krieger et al. |
| 2005/0088149 | A1 * | 4/2005 | Betancourt .................. 320/141 |
| 2008/0048574 | A1 | 2/2008 | Bruwer |

OTHER PUBLICATIONS

"Battery Saver", techlib.com, http://www.techlib.com/files/batsave.pdf, 2 pages printed from the Internet on Dec. 27, 2009.

\* cited by examiner

*Primary Examiner* — Edward Tso
*Assistant Examiner* — Johali Torres Ruiz
(74) *Attorney, Agent, or Firm* — Richard C. Litman

(57) ABSTRACT

The battery saver includes a charge pump connected to a control switch to provide a time-hysteretic threshold feature wherein it takes a longer, elapsed time threshold to activate the control switch than it does to deactivate the control switch. Control switch output is connected to a main switch wherein activation of the control switch opens the main switch to de-energize a battery-powered device's battery circuit. Control switch deactivation closes the main switch, which energizes the battery circuit of the battery-powered device. A quick elapsed time threshold allows a vibration sensor, which indicates continuing use of the battery-powered device, to instantaneously deactivate the control switch when vibrations are sensed. When the vibration sensor no longer senses motion in the device, a longer elapsed time threshold is triggered in which the charge pump slowly ramps up current to activate the control switch to turn the battery-operated device off.

8 Claims, 6 Drawing Sheets

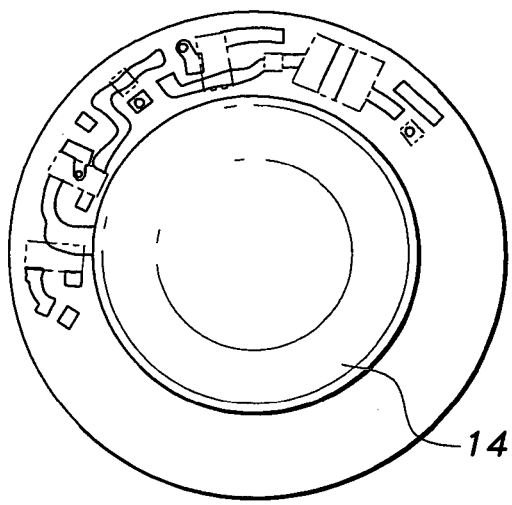
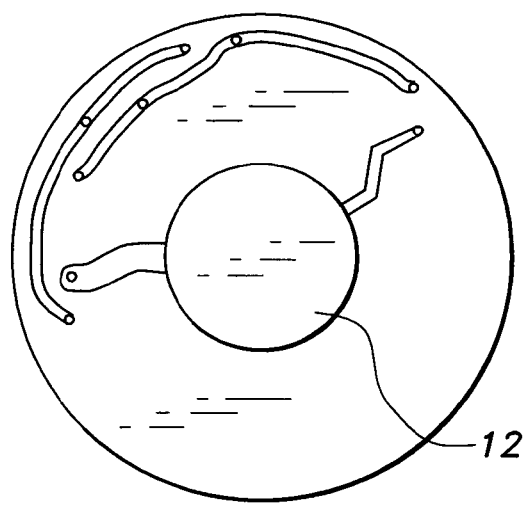
*Fig. 8A*  *Fig. 8B*
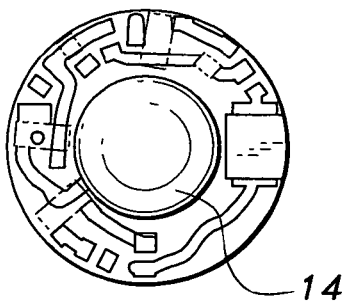
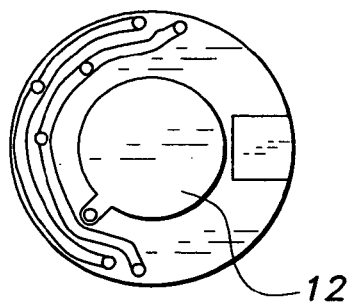
*Fig. 9A*  *Fig. 9B*

BATTERY SAVER

BACKGROUND OF THE INVENTION

1. Field of the Invention

The present invention relates to devices for conserving energy, and particularly to a battery saver that includes a switch that opens a battery circuit of a device after the device has been motionless for a predetermined time period.

2. Description of the Related Art

A known problem with battery-powered devices, such as flashlights, wireless microphones, and the like, is that they are often inadvertently left on after use, resulting in the cost and inconvenience of premature replacement of batteries. To avoid this, some battery-powered devices include timers as part of the circuitry that shut the devices down, or initiate a standby mode, after a predetermined period of non-use.

There is even a product that has a plurality of circuit modules to perform the shut down task. However, there does not appear to be a commercially available shut-off device that has a reliably simple design and that is adaptable to a wide range of products.

Thus, a battery saver solving the aforementioned problems is desired.

SUMMARY OF THE INVENTION

The battery saver includes a charge pump connected to a control switch to provide a time-hysteretic threshold feature wherein it takes a longer, elapsed time threshold to activate the control switch than it does to deactivate the control switch. Control switch output is connected to a main switch wherein activation of the control switch opens the main switch to de-energize a battery-powered device's battery circuit. Control switch deactivation closes the main switch, which energizes the battery circuit of the battery-powered device.

A quick elapsed time threshold allows a vibration sensor, which indicates continuing use of the battery-powered device, to instantaneously deactivate the control switch when vibrations are sensed. When the vibration sensor no longer senses motion in the device, a longer elapsed time threshold is triggered in which the charge pump slowly ramps up current to activate the control switch to turn the battery-operated device off.

These and other features of the present invention will become readily apparent upon further review of the following specification and drawings.

BRIEF DESCRIPTION OF THE DRAWINGS

FIGS. 8A and 8B show top and bottom views, respectively, of a medium-size battery saver according to the present invention.

FIGS. 9A and 9B show top and bottom views, respectively, of a small-size battery saver according to the present invention.

Similar reference characters denote corresponding features consistently throughout the attached drawings.

DETAILED DESCRIPTION OF THE PREFERRED EMBODIMENTS

The battery saver 10 is configured as a thin disc adapted for insertion in a battery housing between a load device and a battery powering the load device. The battery saver 10 is manufactured in several sizes to enable compatibility with a variety of battery sizes and the corresponding devices they power. The battery saver 10 includes a vibration sensor 64 (FIG. 6) that allows the inventive battery saver 10 to pass the battery power to the battery operated device so that it will not turn off as long as the battery-operated device is in motion. The installed battery saver 10 shuts off power to the battery-operated device when the device has been motionless for a predetermined time period. If the battery-operated device has turned off due to being motionless and is reintroduced to motion, the battery saver 10 will turn the battery-operated device back on. Thus, the battery saver 10 prolongs battery life by automatically shutting down a motionless battery operated device.

Figure 1:
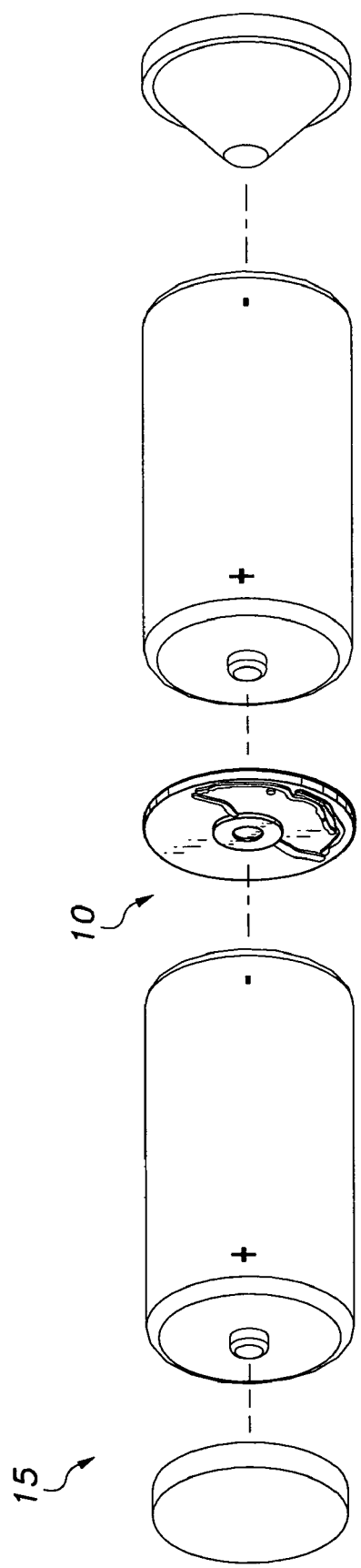
FIG. 1 is an exploded, environmental perspective view of a battery saver according to the present invention, shown in a configuration in which the saver is disposed between two batteries.
Figure 2:
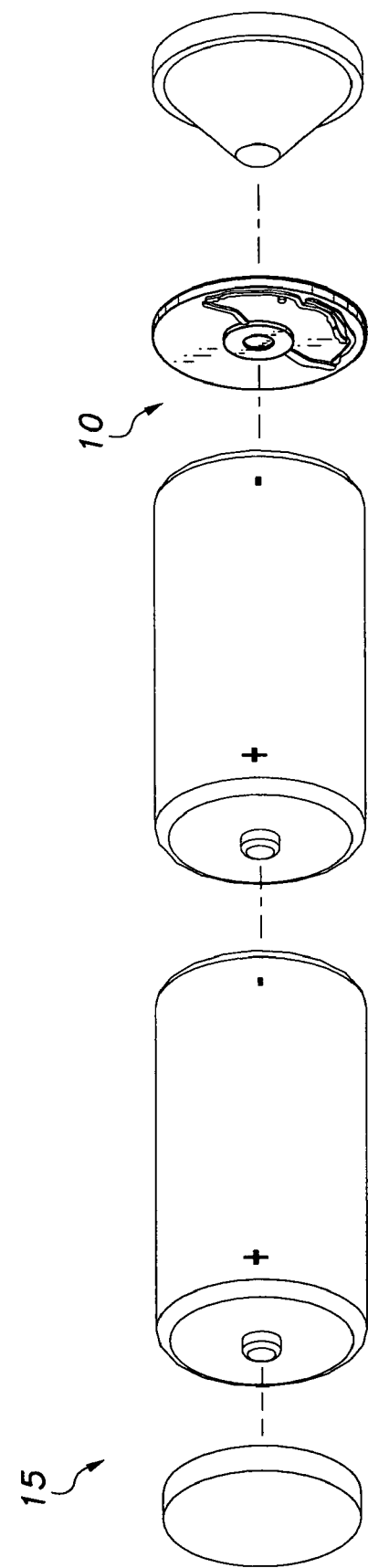
FIG. 2 is an exploded, environmental perspective view of a battery saver according to the present invention, shown in a configuration in which the saver is disposed in series with two batteries.
Figure 3:
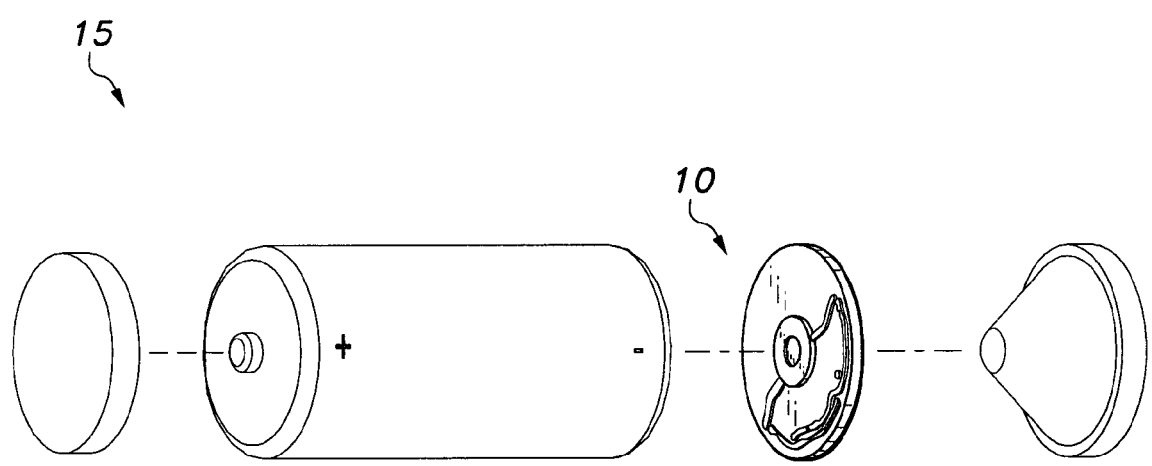
FIG. 3 is an exploded, environmental perspective view of a battery saver according to the present invention, shown in a configuration in which the saver is disposed in series with a single battery.
Figure 4:
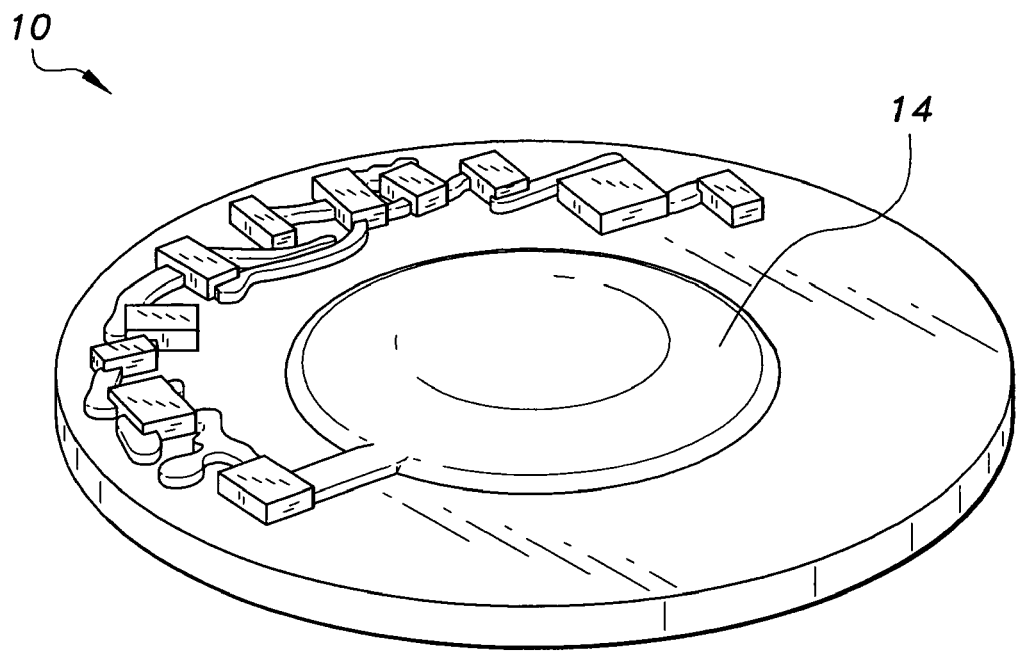
FIG. 4 is a top perspective view of the battery saver according to the present invention.
Figure 5:
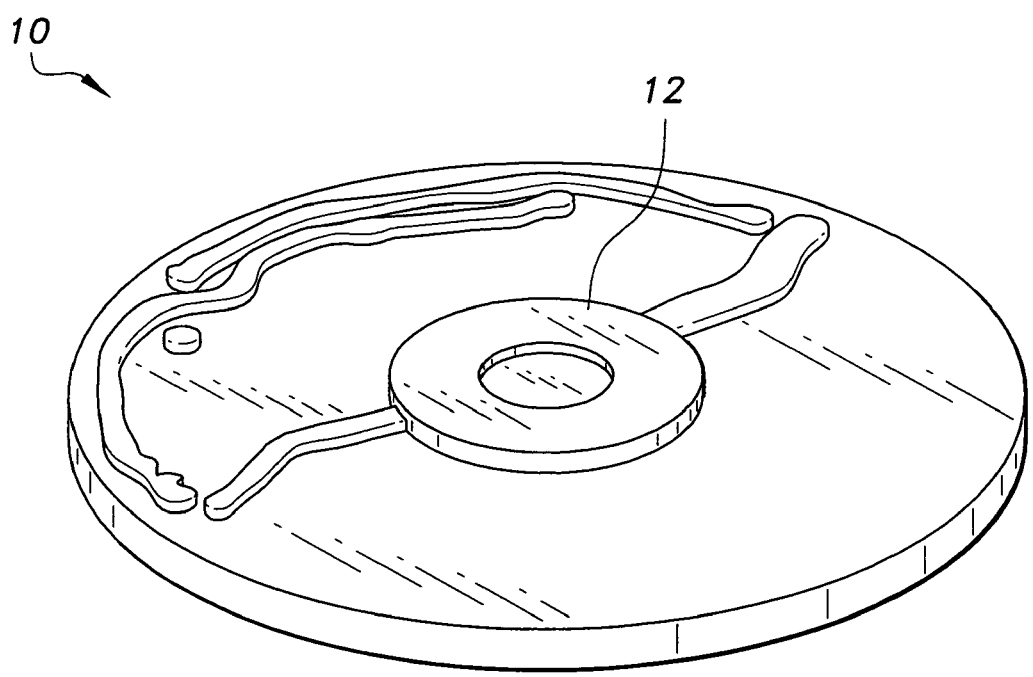
FIG. 5 is a bottom perspective view of the battery saver according to the present invention.

As shown in FIGS. 1-3, the battery saver 10 fits in a battery housing 15 and is versatile enough to either fit between a series of batteries B (as shown in FIG. 1), at the negative terminal end of a series of batteries B (as shown in FIG. 2), or at the negative terminal end of a single battery as shown in FIG. 3. FIG. 4 most clearly shows a top conductive electrode 14 of top component side of the battery saver disc 10. FIG. 5 most clearly shows a bottom conductive electrode 12 of bottom side of the battery saver disc 10.

As shown in FIGS. 7A-9B, the thin, disc shaped circuit board of battery saver 10 has approximately the same size in diameter as either a D sized battery, a C sized battery, or a double A sized battery. The custom sizing of the battery saver 10 allows it to fit in-between or at the end negative terminal of the batteries within the battery housing 15. It is contemplated that inventive battery saver 10 may also be built directly into the batteries, thus making the inventive battery saver 10 universally applicable to all 1.5 volt batteries. The substantially planar, circular top component side electrode 14 has a relatively large diameter to enable sufficient electrical contact with an electrical terminal of a battery housing 15 or, alternatively, electrical contact with a positive battery terminal of battery B. Disposed on a bottom portion of battery saver 10 is the substantially planar, circular electrode 12 having a relatively small diameter that is sufficient for electrical contact with a negative terminal of battery B. Thus the cross sectional area of top component side electrode 14 is substantially greater than the cross sectional area of bottom portion electrode 12. It should be understood that the electrodes 12 and 14 are insulated from each other to provide switching capability of battery saver 10 to make or break connection of battery B to a load device.

Figure 6:
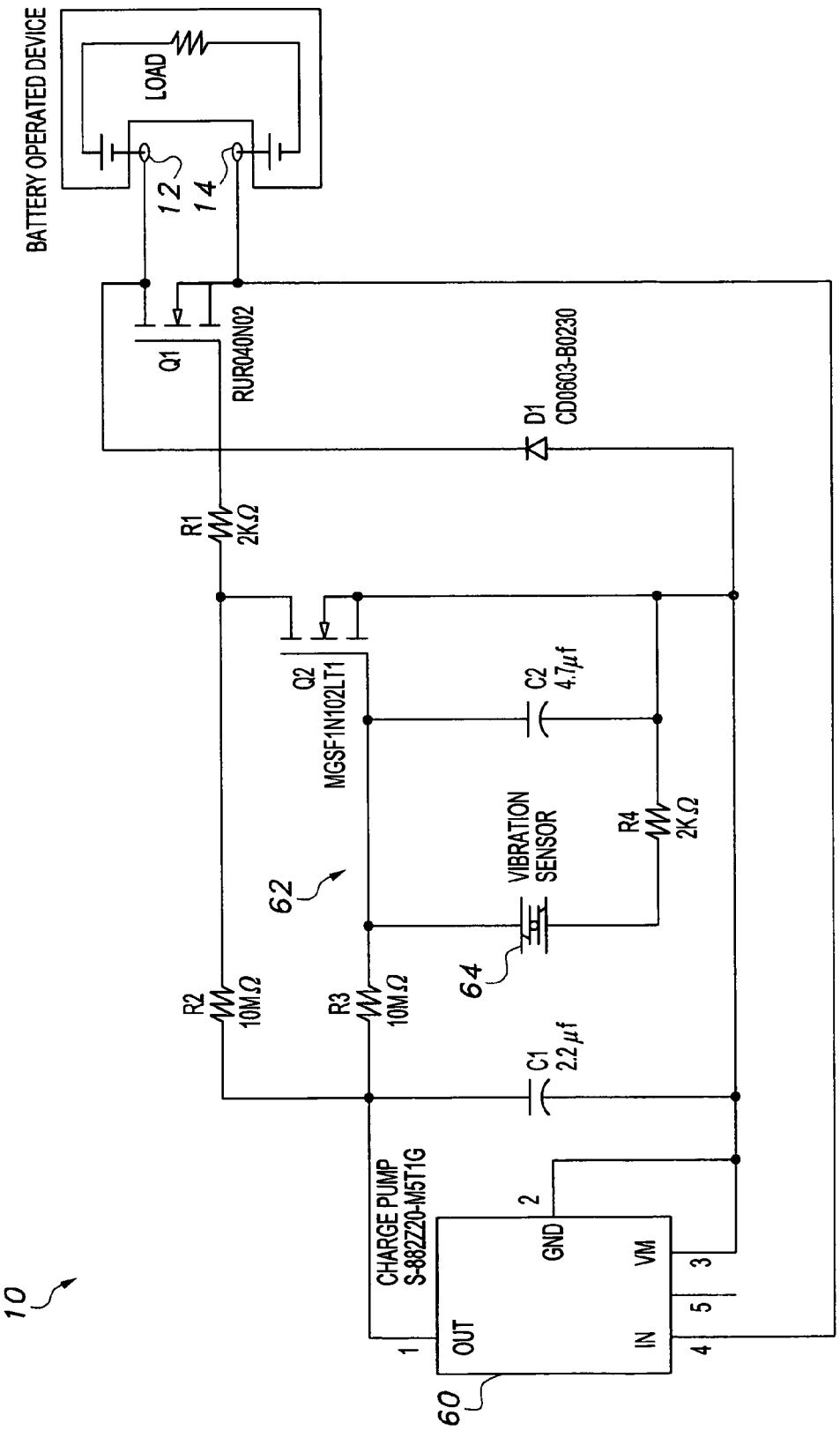
FIG. 6 is a schematic diagram a battery saver circuit according to the present invention.
Figure 7A:
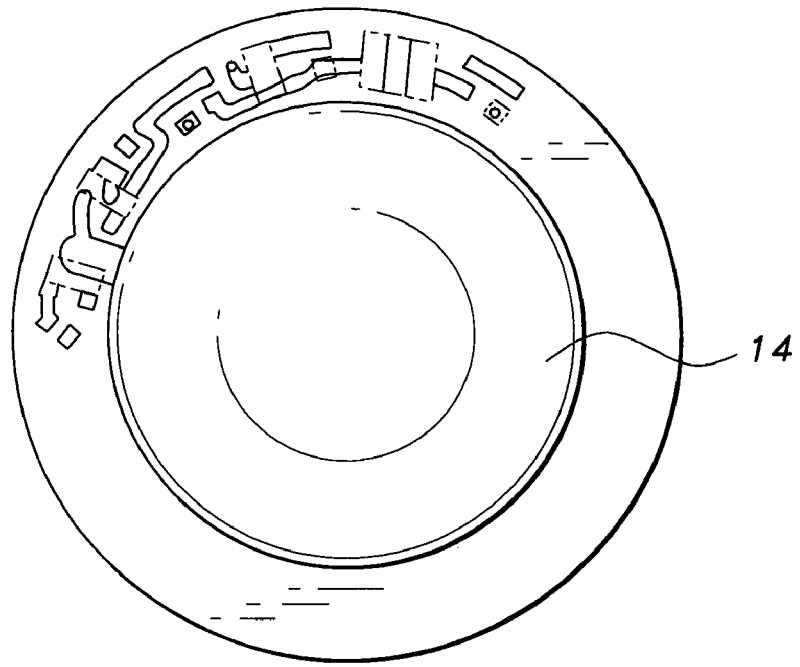
FIGS. 7A and 7B show top and bottom views, respectively, of a large-size battery saver according to the present invention.
Figure 7B:
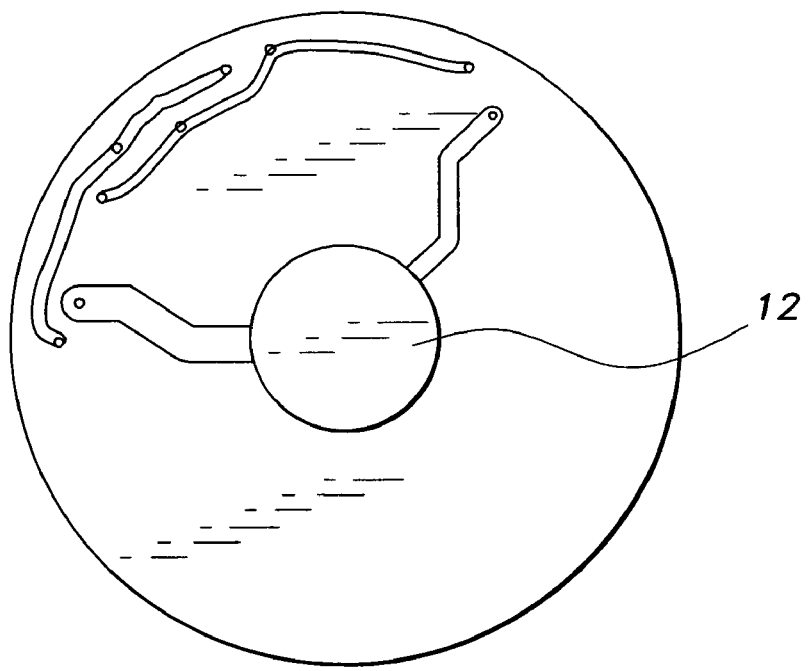

As shown in FIG. 6, components of battery saver 10 include a charge pump 60 connected to a control switch Q2 via R3 and C2 charging combination 62 to provide a time-hysteretic threshold feature wherein it takes a longer, elapsed time threshold to activate the control switch than it does to deactivate the control switch. The time it takes to turn off load device LOAD, i.e., activate MOSFET control switch Q2, is contingent on the RC time constant of resistor R3 in combination with capacitor C2. The value of the resistor R3 is preferably a value that will allow approximately 2 minutes to fully charge the capacitor C2 that then activates MOSFET control switch Q2. Input of charge pump 60 is removably connected to one of the batteries B to provide trickle charge for operation of the charge pump 60. The charge pump 60 has an output of around 2 volts, which charges the RC combination 62 accordingly. The particular exemplary charge pump 60 is a Seiko® S-882720-M5T1G.

The voltage pumped by charge pump 60 is connected via RC combination 62 to input of MOSFET control switch Q2 and switches output of MOSFET control switch Q2 between first conductive and first non-conductive states. An input of main MOSFET electronic switch Q1 is connected to the switch control output of MOSFET switch Q2. MOSFET electronic switch Q1 has an output operable between a second conductive and a second non-conductive state, the output of Q1 being disposed between at least one of batteries B and the load device, thereby selectively connecting the battery B via terminals 12 and 14 to the load device LOAD based on the output configuration of MOSFET switch Q2. When capacitor C2 becomes fully charged, it will turn on switching MOSFET Q2, which, in turn, pulls the voltage that is supplying the main switch MOSFET Q1 to ground, thereby opening contacts 12 and 14 to disconnect batteries B from the battery-operated load device.

As further illustrated in FIG. 6, a vibration sensor 64, which closes its circuit responsive to vibratory movement of the load device, is connected between the resistor-capacitor combination 62 and ground and sets a second threshold timing duration for discharging the capacitor C2 thereby changing the control output of MOSFET switch Q2 from the first conductive state to the first non-conductive state which switches main switching MOSFET Q1 to the "ON", i.e., second conductive, state thereby reconnecting the terminals 12 and 14 to the battery B to supply power to the load device. The second threshold timing duration for discharging capacitor C2 is much less than the first threshold timing duration for charging capacitor C2 via RC combination 62. Thus, a substantially smaller time delay is required for connection of the battery B to the load device when the load device begins to vibrate than the approximately two-minute time delay required for disconnection of the battery B from the load device when the load device has ceased moving. An optional bypass switch could be provided to allow a motionless load device to be charged in its cradle, or the like.

It is to be understood that the present invention is not limited to the embodiment described above, but encompasses any and all embodiments within the scope of the following claims.

I claim:

1. A battery saver, comprising:
   a thin disc adapted for insertion in a battery housing between a load device and a battery powering the load device;
   a charge pump having an input and an output, the battery being adapted for being removably connected to the input of the charge pump;
   a first electronic switch having a switch control output switchable between a first conductive and a first non-conductive state, the first electronic switch having an input connected to the charge pump output;
   a second electronic switch having an input connected to the switch control output of the first electronic switch, the second electronic switch having an output switchable between a second conductive and a second non-conductive state, the second electronic switch output being adapted for placement between the battery and the load device, thereby selectively connecting the battery to the load device based on the switch control output of the first electronic switch;
   a resistor in combination with a capacitor connected to the charge pump output and the first electronic switch input, the resistor and capacitor combination setting a first threshold timing duration for changing the switch control output of the first electronic switch to the first conductive state;
   a vibration sensor responsive to vibratory movement of the load device, the vibration sensor being connected between the resistor-capacitor combination and ground, thereby setting a second threshold timing duration for changing the switch control output of the first electronic switch from the first conductive state to the first non-conductive state, the second threshold timing duration being less than the first threshold timing duration, thereby resulting in a substantially small time delay for connection of the battery to the load device when the load device begins to vibrate and a substantially greater time delay for disconnection of the battery from the load device when the load device has ceased vibrating; and
   wherein the charge pump, the first electronic switch, the second electronic switch, the resistor-capacitor combination, and the vibration sensor are mounted on the thin disc.

2. The battery saver according to claim 1, wherein said disc has first and second substantially planar, circular conducting electrodes on opposing sides of said disc, said second electronic switch output having terminal leads connected to the first and second electrodes, the first circular conducting electrode having a substantially greater cross-sectional area than the second circular conducting electrode.

3. The battery saver according to claim 2, wherein said first substantially planar, circular conducting electrode is mounted on a component side of said thin disc.

4. The battery saver according to claim 1, wherein said charge pump has a charging capacity of approximately 2 volts.

5. The battery saver according to claim 1, wherein said resistor and said capacitor have values establishing the first threshold timing duration to be approximately two minutes.

6. The battery saver according to claim 1, wherein said first and said second electronic switches are MOSFETs.

7. The battery saver according to claim 1, wherein said thin disc is configured for operation when inserted between two batteries connected in series.

8. The battery saver according to claim 1, said thin disc is configured for operation when inserted between a battery and an electrode supported by a battery housing, the battery housing-supported electrode being adapted for connection to the load device.

* * * * *